United States Patent [19]
Kondo

[11] Patent Number: 6,058,217
[45] Date of Patent: May 2, 2000

[54] IMAGE CODING APPARATUS FOR CODING AN IMAGE OF A COMPONENT SIGNAL

[75] Inventor: Tetsujiro Kondo, Kanagawa, Japan

[73] Assignee: Sony Corporation, Tokyo, Japan

[21] Appl. No.: 08/892,601

[22] Filed: Jul. 14, 1997

[30] Foreign Application Priority Data

Jul. 17, 1996 [JP] Japan .................................. 8-206645

[51] Int. Cl.$^7$ .............................. G06K 9/36; G06K 9/46
[52] U.S. Cl. ......................... 382/251; 382/239; 348/405
[58] Field of Search ................................ 382/232, 233, 382/237, 239, 246, 251, 252, 253, 273; 348/405, 202; 358/433; 364/715.02

[56] References Cited

U.S. PATENT DOCUMENTS

| | | | |
|---|---|---|---|
| 5,049,990 | 9/1991 | Kondo et al. ........................... | 348/421 |
| 5,307,163 | 4/1994 | Hatano ................................... | 348/415 |
| 5,432,556 | 7/1995 | Hataro ................................... | 348/415 |
| 5,442,399 | 8/1995 | Asamura et al. ...................... | 349/394 |
| 5,706,009 | 1/1998 | Kondo et al. ........................... | 341/200 |
| 5,734,433 | 3/1998 | Kondo et al. ........................... | 348/421 |
| 5,748,791 | 5/1998 | Park ...................................... | 382/251 |
| 5,748,793 | 5/1998 | Sanpei .................................. | 382/251 |

*Primary Examiner*—Matthew C. Bella
*Attorney, Agent, or Firm*—Frommer Lawrence & Haug, LLP.; William S. Frommer

[57] ABSTRACT

In an image coding apparatus, an image signal constituted of R, G, B components is coded in a high efficiency. The image coding apparatus is arranged by: block making means for subdividing the image to make a predetermined number of image blocks; maximum/minimum value detecting means for detecting a maximum value and a minimum value of each of the plural components which constitute the component signals in pixels within the blocks; dynamic range calculating means for calculating a dynamic range equal to a difference value between the maximum value and the minimum value of each of the plural components; block dynamic range detecting means for detecting a block dynamic range equal to a maximum value thereof from the dynamic range of each of the respective plural components; quantizing step width determining means for determining a quantizing step width used to quantize each of the plural components based upon the block dynamic range; and quantizing means for quantizing each of the plural components in accordance with the quantizing step width determined by the quantizing step width determining means.

5 Claims, 7 Drawing Sheets

NON-EDGE MATCHING

EDGE MATCHING

IMAGE CODING APPARATUS FOR CODING AN IMAGE OF A COMPONENT SIGNAL

BACKGROUND OF THE INVENTION

The present invention generally relates to an image coding apparatus, an image coding method, an image decoding apparatus, and a recording medium. More specifically, the present invention is directed to image coding method/apparatus capable of compressing/coding component image signals in a high efficiency, and also to an image decoding apparatus and a recording medium.

Conventionally, various methods of compressing images have been proposed. The ADRC (Adaptive Dynamic Range Coding) method is known as one of these image compressing methods.

This ADRC method will now be described. For the sake of a simple explanation, as indicated in FIG. 1A, considering now such a block constituted by four pixels arranged on a straight line in this ADRC method, a maximum value "MAX" and a minimum value "MIN" of the pixel values within this block are first detected. Then, while DR=MAX−MIN is set as the localized dynamic range of the block, the pixel values of the pixels for constituting the block are requantized into the K bits based upon this dynamic range DR.

In other words, the minimum value MIN is subtracted from each of the pixel values within the block, and this subtraction value is divided by $DR/2^K$. Then, as a result, the minimum value is converted into the code (ADRC code) corresponding to the resultant division value. Concretely speaking, for instance, in the case of K=2, as represented in FIG. 1B, a judgment is made as to whether or not the division value belongs to any of the ranges obtained by equally dividing the dynamic range DR by 4 (=$2^2$). In the case that the division value belongs to the lowermost level range, the second lowermost level range, the third lowermost level range, or the uppermost level range, the respective division values are converted into 2-bit codes such as 00B, 01B, 10B, 11B (symbol "B" indicates binary number). Then, in the decoding operation, the ADRC code 00B, 01B, 10B, or 11B is converted into the center value (level) $L_{00}$, of the lowermost level range, the center value $L_{01}$, of the second lowermost level range, the center value $L_{10}$ of the third lowermost level range, or the center value $L_{11}$ of the uppermost level range, which are obtained by equally dividing the dynamic range DR by 4. Then, the minimum value MIN is added to the converted value, so that the decoding operation is carried out.

In this case, such an ADRC processing is referred to as "non-edge matching". In contrast to this non-edge matching, as indicated in FIG. 1C, another ADRC processing has been proposed which is referred to as "edge matching". That is, in this edge matching, either the ADRC code 00B or the ADRC code 11B is converted into the average value MIN' of the pixel values belonging to the lowermost level range obtained by equally dividing the dynamic range DR by 4, or the average value MAX' of the pixel values belonging to the uppermost level range, respectively. Furthermore, both the ADRC codes 01B and 10B are converted into such a level for equally dividing the dynamic range DR' by 3, which is defined by MAX'−MIN', so that the ADRC codes are decoded.

It should be noted that the ADRC processing operation is disclosed more in detail, for instance, in Unexamined Published Japanese Patent Application No. Hei 3-53778 previously filed by the Applicant.

In accordance with the ADRC processing operation, the requantization is carried out based on the bit number smaller than the bit number allocated to the respective pixels for constituting the block, so that the data amount of the image can be reduced.

On the other hand, an image signal may be mainly classified into, for instance, a composite signal of the NTSC system or the PAL system, and a component signal of RGB, YUV, YIQ, CMY(K), depending upon the sort of this image signal.

As to an image constructed of composite signals, the coding process operation may be carried out only for the composite signals. However, as to an image constructed of component signals, the coding process operation must be carried out for each of three components, namely R, G, B components, or Y, U, V components, or Y, I, Q components, which constitute the component signal.

As a result, simply comparing two different types of images, the produced coding amount obtained by coding the image constructed of the component signals becomes three times larger than that obtained by coding the image constructed of the composite signals.

SUMMARY OF THE INVENTION

The present invention has been made so as to solve these problems, and therefore, has an object to provide an image coding method, an image coding apparatus, an image decoding apparatus, and a recording medium, in which component signals can be compressed and coded in a high efficiency.

An image coding apparatus, as recited in the first aspect of the present invention, is featured by comprising: maximum/minimum value detecting means for detecting a maximum value and a minimum value of each of the plural components which constitute the component signals in pixels within the blocks; dynamic range calculating means for calculating a dynamic range equal to a difference value between the maximum value and the minimum value of each of the plural components; block dynamic range detecting means for detecting a block dynamic range equal to a maximum value thereof from the dynamic range of each of the respective plural components; quantizing step width determining means for determining a quantizing step width used to quantize each of the plural components based upon the block dynamic range; and quantizing means for quantizing each of the plural components in accordance with the quantizing step width determined by the quantizing step width determining means.

An image coding method, as recited in the third aspect of the present invention, is featured by comprising the steps of: detecting a maximum value and a minimum value of each of the plural components for constituting the component signals in pixels within the blocks; calculating a dynamic range equal to a difference value between the maximum value and the minimum value of each of the plural components; detecting a block dynamic range equal to a maximum value thereof from the dynamic range of each of the respective plural components; determining a quantizing step width used to quantize each of the plural components based on the block dynamic range; and quantizing each of the plural components in accordance with the quantizing step width.

An image decoding apparatus, as recited in the fourth aspect of the present invention, is featured such that, in the case that the coded data is equal to such quantized data which is obtained by: detecting a maximum value and a minimum value of each of the plural components for constituting the component signals in pixels within the blocks;

calculating a dynamic range equal to a difference value between the maximum value and the minimum value of each of the plural components; detecting a block dynamic range equal to a maximum value thereof from the dynamic range of each of the respective plural components; determining a quantizing step width used to quantize each of the plural components based on the block dynamic range; and quantizing each of the plural components in accordance with the quantizing step width; the image decoding apparatus is comprised of: converting means for converting the quantized data corresponding to each of the plural components into a predetermined level based on the block dynamic range.

A recording medium, as recited in the fifth aspect of the present invention, is featured by that the below-mentioned quantized data is recorded on this recording medium as coded data obtained by coding an image of a component signal constructed of a plurality of components, and the quantized data is obtained by: detecting a maximum value and a minimum value of each of the plural components for constituting the component signals in pixels within the blocks; calculating a dynamic range equal to a difference value between the maximum value and the minimum value of each of the plural components; detecting a block dynamic range equal to a maximum value thereof from the dynamic range of each of the respective plural components; determining a quantizing step width used to quantize each of the plural components based on the block dynamic range; and quantizing each of the plural components in accordance with the quantizing step width.

In the image coding apparatus as recited in the first aspect, the maximum/minimum value detecting means detects the maximum value and the minimum value of each of the plural components which constitute the component signals in pixels within the blocks, and the dynamic range calculating means calculates the dynamic range equal to the difference value between the maximum value and the minimum value of each of the plural components. The block dynamic range detecting means detects the block dynamic range equal to the maximum value thereof from the dynamic range of each of the respective plural components, and the quantizing step width determining means determines the quantizing step width used to quantize each of the plural components based upon the block dynamic range. The quantizing means quantizes each of the plural components in accordance with the quantizing step width determined by the quantizing step width determining means.

In the image coding method as recited in the third aspect, the image coding method is carried out by: detecting the maximum value and the minimum value of each of the plural components for constituting the component signals in pixels within the blocks; calculating the dynamic range equal to the difference value between the maximum value and the minimum value of each of the plural components; detecting the block dynamic range equal to the maximum value thereof from the dynamic range of each of the respective plural components; determining the quantizing step width used to quantize each of the plural components based on the block dynamic range; and quantizing each of the plural components in accordance with the quantizing step width.

In the image decoding apparatus as recited in the fourth aspect, in the case that the coded data is equal to such quantized data which is obtained by: detecting the maximum value and the minimum value of each of the plural components for constituting the component signals in pixels within the blocks; calculating the dynamic range equal to the difference value between the maximum value and the minimum value of each of the plural components; detecting the block dynamic range equal to the maximum value thereof from the dynamic range of each of the respective plural components; determining the quantizing step width used to quantize each of the plural components based on the block dynamic range; and quantizing each of the plural components in accordance with the quantizing step width; the converting means converts the quantized data corresponding to each of the plural components into a predetermined level based on the block dynamic range.

In the recording medium as recited in the fifth aspect, the below-mentioned quantized data is recorded as the coded data obtained by coding the image of the component signal constituted by a plurality of components, and this quantized data is obtained by: detecting the maximum value and the minimum value of each of the plural components for constituting the component signals in pixels within the blocks; calculating the dynamic range equal to the difference value between the maximum value and the minimum value of each of the plural components; detecting the block dynamic range equal to the maximum value thereof from the dynamic range of each of the respective plural components; determining the quantizing step width used to quantize each of the plural components based on the block dynamic range; and quantizing each of the plural components in accordance with the quantizing step width.

BRIEF DESCRIPTION OF THE DRAWINGS

For a better understanding of the present invention, reference is made of the detailed description to be read in conjunction with the accompanying drawings, in which.

DETAILED DESCRIPTION OF THE PREFERRED EMBODIMENTS

Figure 1A:
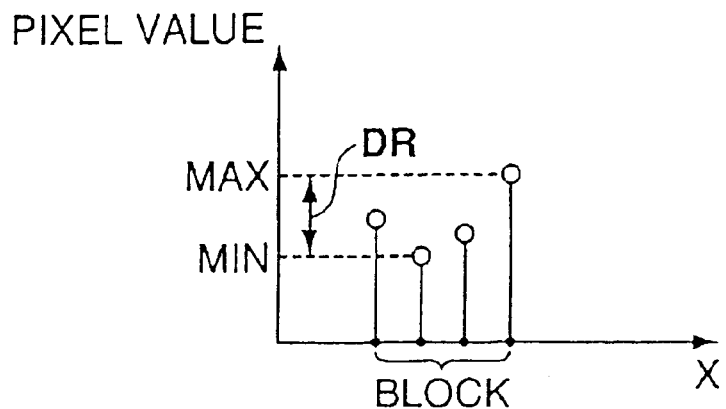
FIG. 1A to FIG. 1C illustratively explain the ADRC processing operation.

Before describing various preferred embodiments (embodiment modes) of the present invention, features of this invention will now be described as follows, while adding the corresponding embodiments to the respective means constituting the claimed invention in order to clarify correspondence relationships between the means of the claimed invention and the relevant embodiments.

That is, an image coding apparatus as recited in the first aspect is featured by such an image coding apparatus for coding an image of a component signal constituted by a plurality of components, comprising: block making means (e.g., block-making unit 21 shown in FIG. 4) for subdividing the image to make a predetermined number of image blocks; maximum/minimum value detecting means (e.g., dynamic range detecting units 23R, 23G, 23B shown in FIG. 4) for detecting a maximum value and a minimum value of each of the plural components which constitute the component signals in pixels within the blocks; dynamic range calculating means (e.g., dynamic range detecting units 23R, 23G, 23B shown in FIG. 4) for calculating a dynamic range equal to a difference value between the maximum value and the minimum value of each of the plural components; block dynamic range detecting means (e.g., maximum value detecting unit 24 shown in FIG. 4) for detecting a block dynamic range equal to a maximum value thereof from the dynamic range of each of the respective plural components; quantizing step width determining means (e.g., maximum value detecting unit 24 shown in FIG. 4) for determining a quantizing step width used to quantize each of the plural components based upon the block dynamic range; and quantizing means (e.g., equalizers 27R, 27G, 27B shown in FIG. 4) for quantizing each of the plural components in accordance with the quantizing step width determined by the quantizing step width determining means.

An image coding apparatus as recited in the second aspect is featured by further comprising: difference calculating means (e.g., calculators 26R, 26G, 26B shown in FIG. 4) for calculating a difference between each of the plural components and a minimum value thereof, wherein: the quantizing means quantizes the difference between each of the plural components and the minimum value thereof.

An image decoding apparatus as recited in the fourth aspect is featured by such an image decoding apparatus for decoding coded data produced by coding an image of a component signal constituted by a plurality of components wherein: in the case that the coded data is equal to such quantized data which is obtained by: subdividing the image to make a predetermined number of image blocks; detecting a maximum value and a minimum value of each of the plural components for constituting the component signals in pixels within the blocks; calculating a dynamic range equal to a difference value between the maximum value and the minimum value of each of the plural components; detecting a block dynamic range equal to a maximum value thereof from the dynamic range of each of the respective plural components; determining a quantizing step width used to quantize each of the plural components based on the block dynamic range; and quantizing each of the plural components in accordance with the quantizing step width; the image decoding apparatus is comprised of: converting means (e.g., converters 32R, 32G, 32B shown in FIG. 8) for converting the quantized data corresponding to each of the plural components into a predetermined level based on the block dynamic range.

Apparently, the above descriptions are not limited to the technical scope and spirit of the present invention, but are merely intended to exemplifications.

Figure 2:
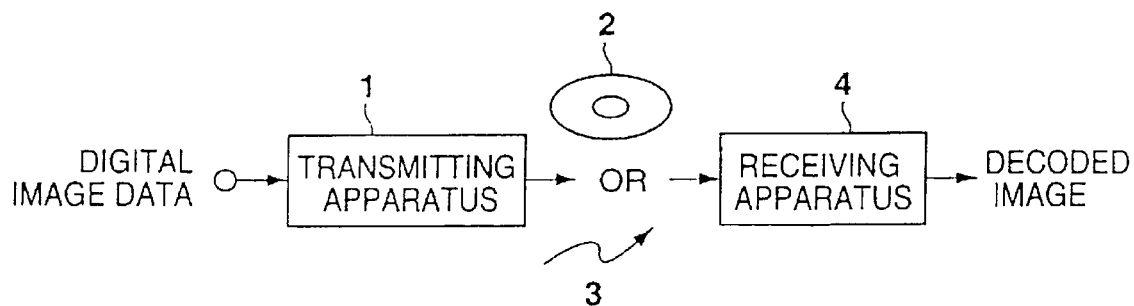
FIG. 2 is a schematic block diagram for indicating an arrangement of an image processing apparatus according to an embodiment of the present invention.

In FIG. 2, there is shown an arrangement of an image processing apparatus according to an embodiment of the present invention.

In this image processing apparatus, digitalized image data is supplied to a transmitting apparatus 1. In this apparatus, a component signal constituted by, for instance, three components R (red), G (green), and B (blue) is supplied as the image data. Also, in this embodiment, it is assumed that each of the R, G, and B components is constructed of, e.g., 8 bits.

The transmitting apparatus 1 executes the ADRC processing operation for the entered image data in the color space so as to compress/decode the image data to obtain coded image data. Then, the transmitting apparatus 1 records this coded data on a recording medium 2 such as an optical disk, a magnetic optical (MO) disk, a magnetic tape, and the like, or transmits the coded data via a transmission path 3 such as a ground wave, a satellite line, a telephone line, a CATV network, and the like.

In a receiving apparatus 4, either the coded data which has been recorded on the recording medium 2 is reproduced or the coded data which has been transmitted via the transmission path 3 is received, and then this decoded data is expanded and decoded to obtain a decoded image. The receiving apparatus 4 supplies the decoded image to a display (not shown) so as to display the decoded image thereon.

It should be understood that the above-explained image processing apparatus may be applied to, for example, an image recording/reproducing apparatus such as an optical disk apparatus, a magnetic optical disk apparatus, and a magnetic tape apparatus. Also, this image processing apparatus may be applied to, for instance, an image transmitting apparatus such as a television telephone apparatus, a television broadcasting system, and a CATV system. Furthermore, this image processing apparatus may be applied to, for instance, a portable telephone and a portable terminal, the transmission rates of which are low.

Figure 3:
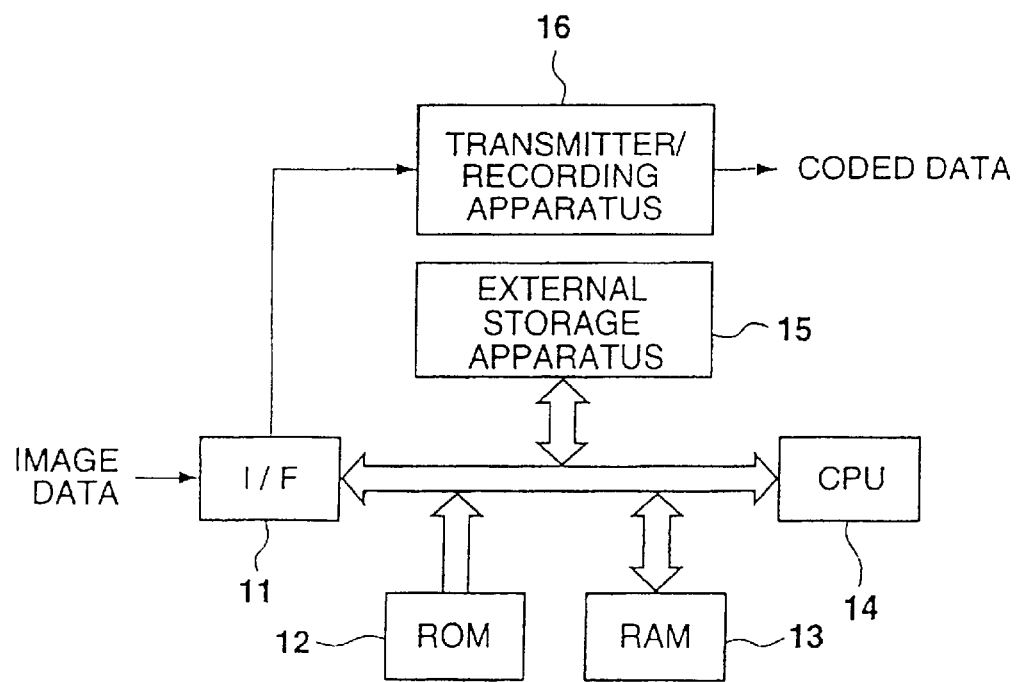
FIG. 3 is a schematic block diagram for representing a structural example of the transmitting apparatus 1 employed in the image processing apparatus of FIG. 2.

FIG. 3 indicates a structural example of the above-described transmitting apparatus 1.

An I/F (interface) 11 is designed so as to perform a process operation for receiving the externally supplied image data, and also another process operation for transmitting the coded data with respect to a transmitter/recording apparatus 16. A ROM (read-only memory) 12 previously stores an IPL (initial program loading) program, and other programs. A RAM (random access memory) 13 may store an application program and a system program (Operating System) recorded on an external storage apparatus 15, and may store data necessary for operations of a CPU (central processing unit) 14. In accordance with the IPL program stored in the ROM 12, the CPU 14 extends the system program and the application program from the external storage apparatus to the RAM 13, and executes the application program under control of this system program. As a result, the CPU 14 may perform a coding process operation (will be explained) with respect to the image data supplied from the I/F 11. The external storage apparatus 15 is arranged by, for instance, a magnetic disk apparatus. As previously explained, the external storage apparatus 15 stores therein the system program and the application program executed by the CPU 14, and further stores the data necessary for the operations of the CPU 14. The transmitter/recording apparatus 16 causes the coded data supplied from the I/F 11 to be recorded on the recording medium 2, or to be transmitted via the transmission path 3.

It should be noted that the I/F 11, the ROM 12, the RAM 13, the CPU 14, and the external storage apparatus 15 are mutually connected via a bus.

In the transmitting apparatus 1 with employment of the above-described arrangement, when the image data is supplied to the I/F 11, this image data is furnished to the CPU 14. The CPU 14 codes the image data to obtain the coded image data which is supplied to the I/F 11. Upon receipt of the coded data, the I/F 11 supplies this coded data to the transmitter/recording apparatus 16. In this transmitter/ recording apparatus 16, the coded data derived from the I/F 11 is recorded on the recording medium 2, or transmitted via the transmission path 3.

Figure 4:
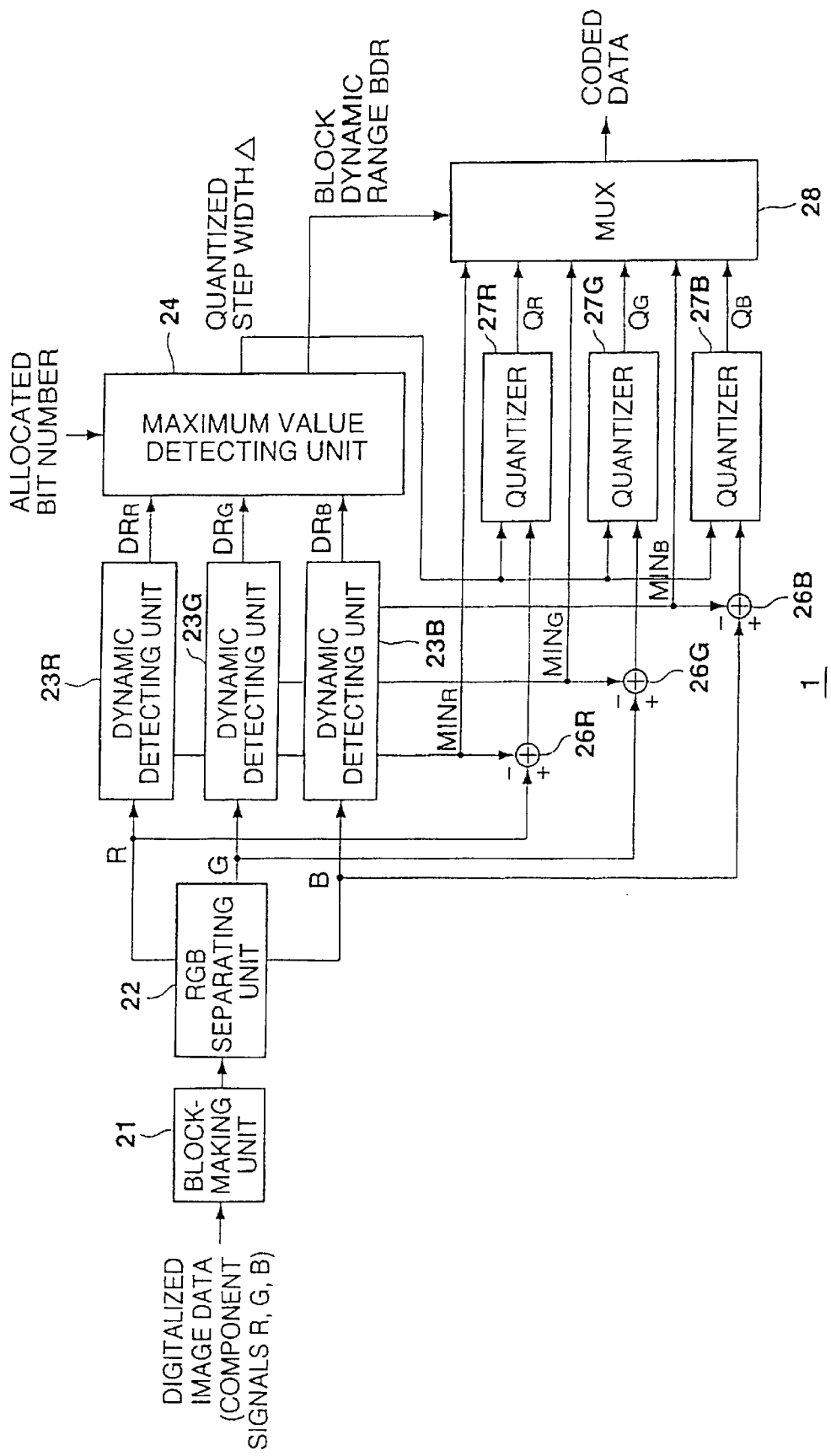
FIG. 4 indicates a functional circuit block diagram of the transmitting apparatus 1 shown in FIG. 3.

FIG. 4 is a functional block diagram for representing an internal circuit arrangement of the transmitting apparatus shown in FIG. 3, except for the circuit portion of the transmitter/recording apparatus 16.

In FIG. 4, R, G, B signals functioning as the component signals are supplied in unit of, for example, 1 frame (field) to a block-making unit 21. The block-making unit 21 subdivides image data of this 1 frame into blocks constructed by a preselected number of pixels, and sequentially supplies these image data blocks to an RGB separating unit 22. The RGB separating unit 22 separates R, G, B signals (component signals) as to each of the pixels within the blocks supplied from the block-making unit 21 into an R component, a G component, and a B component. Then, the RGB separating unit 22 supplies these separated R component, G component and B component to dynamic range detecting units 23R, 23G, 23B, respectively. It should also be noted that the R component, the G component, and the B component are also supplied to calculators 26R, 26G, 26B other than the dynamic range detecting units 23R, 23G, 23B, respectively.

Upon receipt of the R components as to the pixels within 1 block, the dynamic range detecting unit 23R detects a maximum value $MAX_R$ and a minimum value $MIN_R$ among them from the RGB separating unit 22, and then supplies this minimum value $MIN_R$ to the calculator 26R. Furthermore, the dynamic range detecting unit 23R calculates a difference value between the maximum value and the minimum value contained in the R components, and supplies this difference value as a dynamic range $DR_R$ of the R components to a maximum value detecting unit 24.

Similar to the processing operation by the dynamic range detecting unit 23R, the dynamic range detecting units 23G and 23B perform the detecting operation as to the G component and the B component supplied from the RGB separating unit 22 in order that a maximum value $MAX_G$ and a minimum value $MIN_G$ contained in the G component within the block and also a dynamic range $DR_G$ thereof, and further a maximum value $MAX_B$ and a minimum value $MIN_B$ contained in the B component within the block and also a dynamic range $DR_B$ thereof are obtained. Either the minimum value $MIN_G$ of the G component or the minimum value $MIN_B$ of the B component detected in either the dynamic range detecting unit 23G or the dynamic range detecting unit 23B is supplied to either a calculator 26G or a calculator 26B.

A maximum value detecting unit 24 detects a maximum value from the dynamic ranges $DR_R$, $DR_G$, $DR_B$ supplied from the dynamic range detecting units 23R, 23G, 23B, respectively, and then supplies the detected maximum value as a dynamic range BDR of the block (block dynamic range) to a multiplexer (MUX) 28. Furthermore, the maximum value detecting unit 24 determines a quantizing step width "Δ" which is commonly used to quantize (requantize) the R component, the G component, and the B component based on this block dynamic range BDR, and also furnishes the quantizing step width "Δ" to quantizers 27R, 27G, 27B, respectively. It should be noted that an allocated bit number "K" (namely, bit number used to express one component of one pixel) which should be allocated to the quantized image data is supplied to the maximum value detecting unit 24 from a circuit (not shown), and also the quantizing step width "Δ" is determined in accordance with the following formula $\Delta = BDR/2^K$.

The calculator 26R calculates a difference between the R component derived from the RGB separating unit 22 and the minimum value $MIN_R$ of the R components within the block, supplied from the dynamic range detecting unit 23R, and supplies this calculated difference value to the quantizer 27R.

Similar to the above-described calculation by the calculator 26R, either the calculator 26G or the calculator 26B calculates either a difference between the G component and the minimum value $MIN_G$ thereof or a difference between the B component and the minimum value $MIN_B$ thereof, and then supplies these difference values to the quantizers 27G, or 27B, respectively.

The quantizer 27R quantizes the difference between the output from the calculator 26R, namely the R component and the minimum value $MIN_R$ in the block thereof based upon the quantizing step width "Δ" supplied from the maximum value detecting unit 24. Then, the quantizer 27R supplies the resultant quantized data (ADRC code) $Q_R$ to the multiplexer 28.

Similar to the quantizing operation by the quantizer 27R, the quantizer 27G or 27B quantizes either a difference between the G component of the calculator 26G and the minimum value $MIN_G$ in the block thereof, or a difference between the B component of the calculator 26B and the minimum value $MIN_B$ in the block thereof based on the quantizing step width "Δ", and then supplies the resultant quantized data $Q_G$ or $Q_B$ to the multiplexer 28.

The multiplexer 28 multiplexes in unit of a block, the minimum values $MIN_R$, $MIN_G$, $MIN_B$ derived from the dynamic range detecting units 23R, 23G, 23B; the block dynamic range BDR derived from the maximum value detecting unit 24; and the quantized data $Q_R$, $Q_G$, $Q_B$ supplied from the quantizers 27R, 27G, 27B. Then, the multiplexer 28 outputs the multiplexed results as the coded data of the image.

Referring now to a flow chart of FIG. 5, operations of the above-described image processing apparatus will be described.

Figure 6:
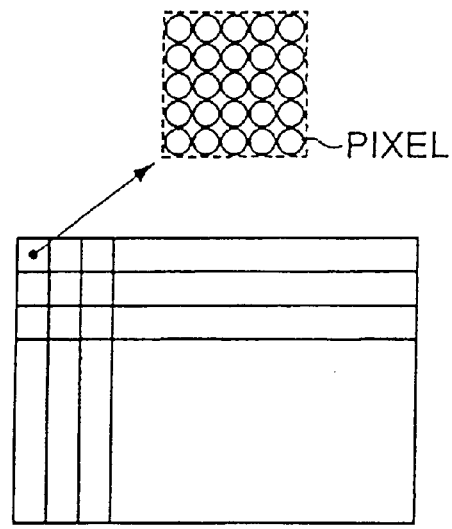
FIG. 6 illustrates a block.

Upon receipt of, for example, 1 frame (1 field) of R, G, B signals, the block-making unit 21 subdivides this frame into a block constituted by, e.g., 25 pixels of 5×5 (lateral× longitudinal) shown in FIG. 6 at a step S1, and then supplies this block to the RGB separating unit 22. At a step S2, in the RGB separating unit 22, the R, G, B signals derived from the block-making unit 22 as to each of the pixels in the block are separated into the three components of the R component, the G component, and the B component. These R component, G component, and B component are supplied to the dynamic range detecting units 23R, 23G, 23B, and the calculators 26R, 26G, 26B, respectively.

When the R components as to the pixels within 1 block are received from the RGB separating unit 22, at a step S3, the dynamic range detecting unit 23R detects the maximum value $MAX_R$ and the minimum value $MIN_R$ from these R components, and then supplies these detected maximum/ minimum values $MAX_R$ and $MIN_R$ to the calculator 26R. Furthermore, the dynamic range detecting unit 23R calculates the difference between the maximum value of the R components and the minimum value thereof, and then supplies the resultant dynamic range $DR_R$ of the R components to the maximum value detecting unit 24.

Also, in the dynamic range detecting units 23G and 23B, the maximum value $MAX_G$ and the minimum value $MIN_G$ of the G components within the block and also the dynamic range $DR_G$ are obtained, and the maximum value $MAX_B$ and the minimum value $MIN_B$ of the B components within the block and also the dynamic range $DR_B$ are obtained. Then, either the minimum value $MIN_G$ or the minimum value $MIN_B$ is supplied to either the calculator 26G or the calculator 26B, and both the dynamic ranges $DR_G$ and $DR_B$ are supplied to the maximum value detecting unit 24.

Furthermore, at the step S3, the maximum value is detected from the dynamic ranges $DR_R$, $DR_G$, $DR_B$, in the maximum value detecting unit 24, and then this detected maximum value is supplied as the block dynamic range BDR to the multiplexer 28.

Figure 7A:
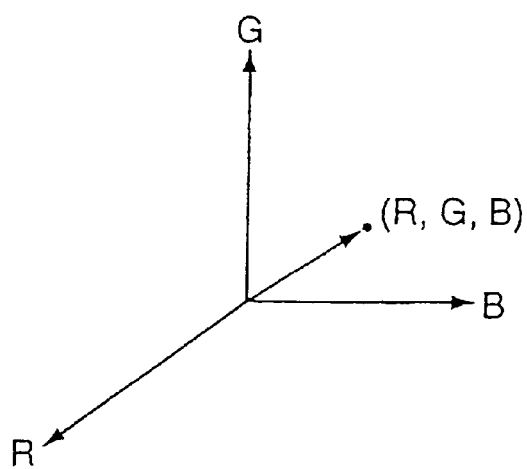
FIG. 7A and FIG. 7B are explanatory diagrams for explaining dynamic ranges $DR_R$, $DR_G$, $DR_B$ of R, G, B components.
Figure 7B:
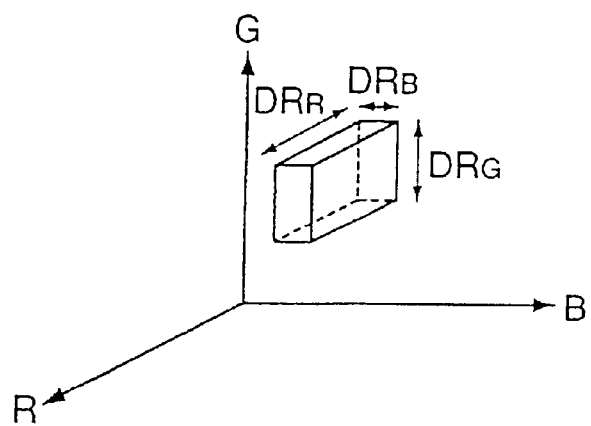

In this case, as indicated in FIG. 7A, the three components R, G, B as to a certain pixel can be expressed by one vector in the RGB space. However, as represented in FIG. 7B, the dynamic ranges $DR_R$, $DR_G$, $DR_B$ define a length, a breadth, and a height of a rectangular parallelepiped indicative of a range where the above-described vector is present as to pixels in a certain block. As a result, the block dynamic range BDR corresponds to the longmost portion among the length, breadth, and height of such a rectangular parallelepiped.

Figure 5:
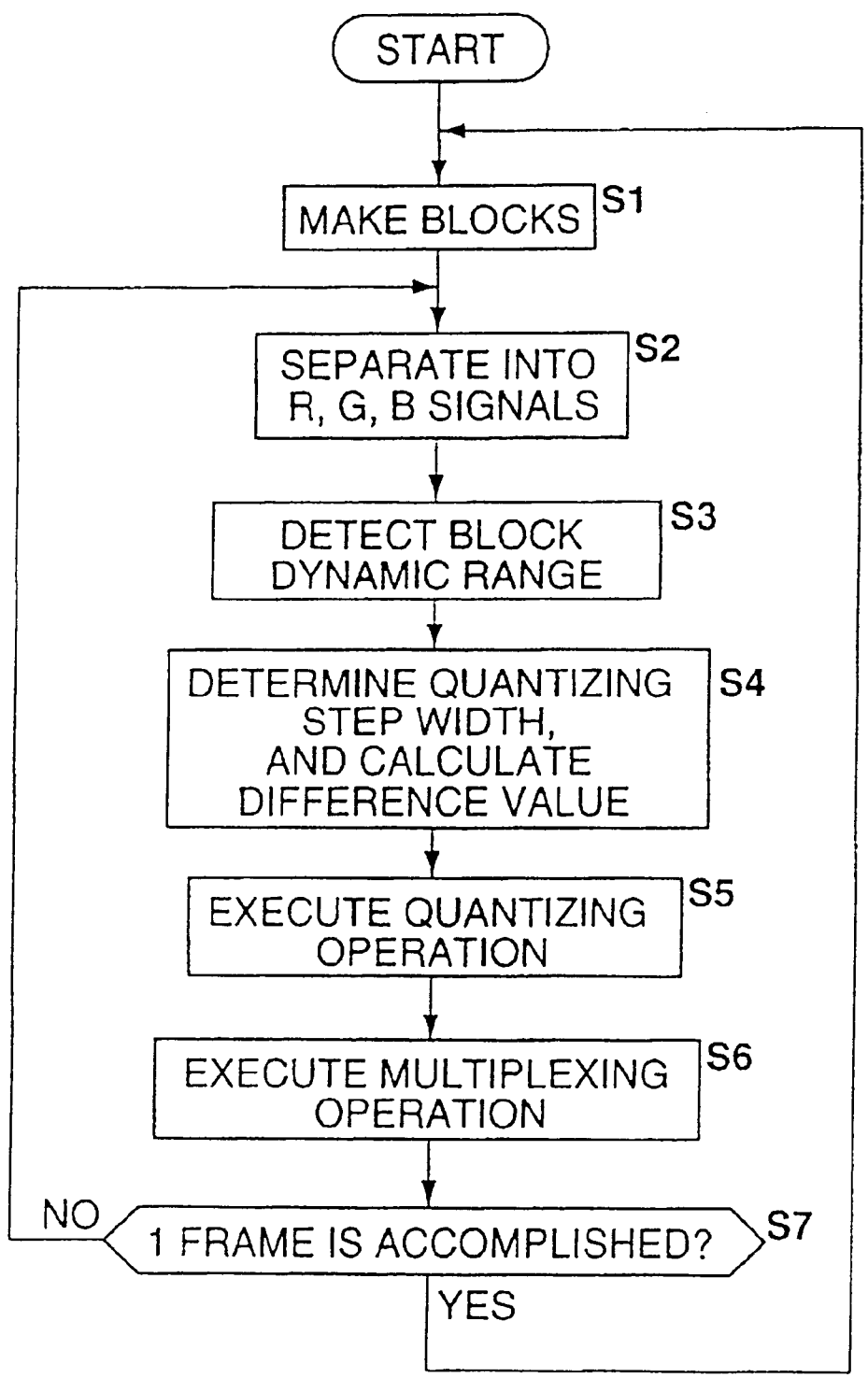
FIG. 5 is a flow chart for explaining operations of the transmitting apparatus 1 shown in FIG. 4.

Returning back to the flow chart of FIG. 5, when the maximum value detecting unit 24 detects the block dynamic range BDR, the maximum value detecting unit 24 determines the quantizing step width "Δ" based upon this detected block dynamic range BDR at a step S4, and then supplies the quantizing step width "Δ" to the quantizers 27R, 27G, and 27B.

At a step S4, in the calculator 26R, a calculation is made of a difference between the R component derived from the RGB separating unit and the minimum value $MIN_R$ of the R components within the block, derived from the dynamic range detecting unit 23R, and then this difference value is supplied to the quantizer 27R. At the same time, also in either the calculator 26G or the calculator 26B, a calculation is made between the G component and the minimum value $MIN_G$ of the G components, or between the B component and the minimum value $MIN_B$ of the B components. Then, the respective difference values are supplied to the quantizer 27G, or 27B.

At a step S5, in the quantizers 27R, 27G, 27B, the respective outputs from the calculators 26R, 26G, 26B are quantized in accordance with the quantizing step width "Δ" supplied from the maximum value detecting unit 24 to thereby obtain the quantized data $Q_R$, $Q_G$, $Q_B$. That is, for instance, when the allocated bit amount "K" is 2 bits, each of the outputs from the calculators 26R, 26G, 26B is divided by the quantizing step width Δ=BDR/4, and as previously explained with reference to FIG. 1, the 2-bit codes (ADRC codes) corresponding to the respective divided values are outputted as the quantized data $Q_R$, $Q_G$, $Q_B$:

These quantized data $Q_R$, $Q_G$, $Q_B$ are supplied to the multiplexer 28. At a step S6, the multiplexer 28 executes a predetermined process operation with respect to the quantized data $Q_R$, $Q_G$, $Q_B$. Furthermore, the respective minimum values $MIN_R$, $MIN_G$, $MIN_B$ derived from the dynamic range detecting units 23R, 23G, 23B are multiplexed with the block dynamic range BDR derived from the maximum value detecting unit 24 in unit of the block. The multiplexed result is outputted as the coded data of the image. It should be understood that the same bit numbers (in this embodiment, 8 bits, as previously explained) as those of the original R, G, B components are allocated to the minimum values $MIN_R$, $MIN_G$, $MIN_B$, and also the block dynamic range BDR. The bit number which is allocated to the quantized data $Q_R$, $Q_G$, $Q_B$ will be discussed later.

Then, the process operation is advanced to a step S7 at which a judgment is made as to whether or not the process operation with respect to 1 frame of the image data is accomplished. When it is judged that the process operation with respect to 1 frame of the image data is not yet completed, the process operation is returned to the previous step S2. Then, the process operation defined at the steps subsequent to this step S2 is repeatedly performed with respect to the next block. Conversely, when it is so judged at the step S7 that the process operation with respect to 1 frame of the image data has been completed, the process operation is returned to the previous step S1. At this step S1, the process operations defined at steps subsequent to the step S1 are repeatedly carried out with respect to a next frame of the image data.

As described above, since all of the R components, the G components, and the B components are quantized (requantized) in accordance with the quantizing step width "Δ" determined based on the block dynamic range BDR, the data amount of the coded data can be lowered.

In other words, as previously explained, the quantizing step width "Δ" may be obtained by dividing the block dynamic range BDR, namely the maximum value among the dynamic ranges $DR_R$, $DR_G$, $DR_B$ of the R components, the G components, and the B components by $2^K$. As a consequence, in such a case that, for instance, one dynamic range $DR_R$ is extremely larger than other two dynamic range $DR_G$ and $DR_B$ among the dynamic ranges $DR_R$, $DR_G$, $DR_B$ in a certain block, there are many possibilities that the quantizing step width "Δ" is greater than the outputs from the calculators 26G and 26B. As a result, most of the divided values by the quantizing step width "Δ" as to the G component and the B component will belong to the lowermost level range as explained in FIG. 1.

Accordingly, in this case, as to the quantized data $Q_G$, and $Q_B$ about the G component and the B component, there are many possibilities that the same values, e.g., 0 are continued. In the multiplexer 28, the data amount of the coded data can be reduced by using such a 0-continued number as the coded data. Otherwise, for example, as to such a component which can be expressed by the bit number smaller than the allocated bit number "K" supplied to the maximum value detecting unit 24, such a small bit number is allocated to this component together with this bit number "K" so as to produce the coded data. That is, the allocated bit numbers with respect to the respective components are variable, so that the data amount of the coded data can be reduced. It should be understood that the allocated bit numbers with respect to the respective components may be fixed to the allocated bit number "K" supplied to the maximum value detecting unit 24 (namely, the allocated bit numbers for the respective components may be set to fixed lengths).

Furthermore, in the related art, since the R, G, B components are requantized by employing the respective dynamic ranges $DR_R$, $DR_G$, $DR_B$, the three dynamic ranges $DR_R$, $DR_G$, $DR_B$ must be contained in the coded data as the overhead. In the case of FIG. 4, only the block dynamic range BDR may be contained in the coded data, so that the data amount of the coded data can be reduced in view of this aspect.

It should also be noted that since the R, G, B components own the relative relationship, even when a certain component is requantized by employing a relatively large block dynamic range BDR, it is possible to obtain such a decoded image having substantially no deterioration of an image quality based upon the component corresponding to the dynamic range (any one of $DR_R$, $DR_G$, $DR_B$) for constituting this relatively large block dynamic range BDR on the side of the receiving apparatus 4 (see FIG. 2).

Figure 8:
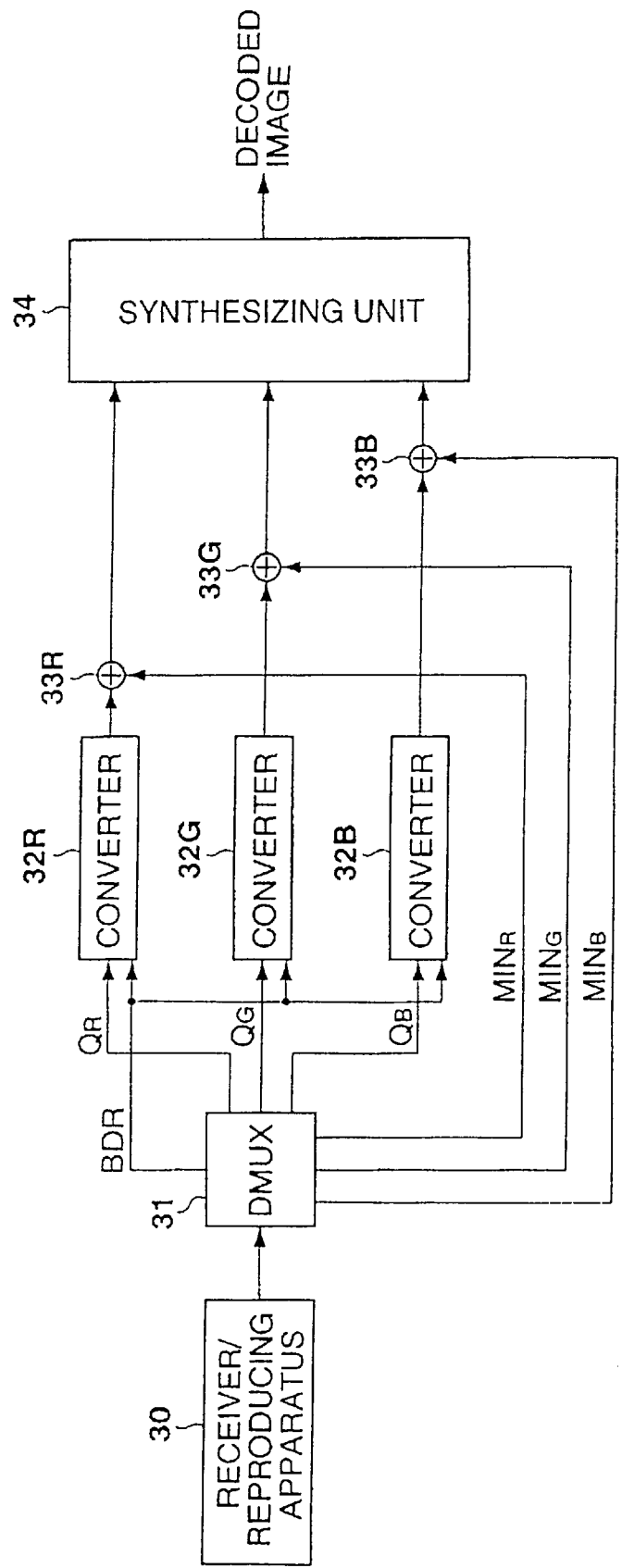
FIG. 8 is a schematic block diagram for representing a structural example of the receiving apparatus shown in FIG. 2.
Figure 9:
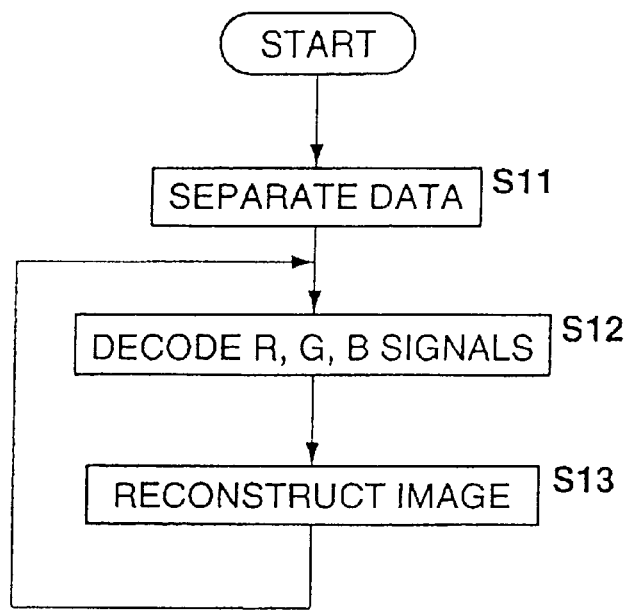
FIG. 9 is a flow chart for describing operations of the receiving apparatus 4 shown in FIG. 8.

FIG. 8 represents a structural example of the receiving apparatus 4 shown in FIG. 2.

A receiver/reproducing apparatus 30 reproduces the coded data recorded on the recording medium 2, or receives the coded data transmitted via the transmission path 3, and then supplies the coded data to a demultiplexing unit (DMUX) 31. The demultiplexing unit 31 demultiplexes the quantized data $Q_R$, $Q_G$, $Q_B$, the block dynamic range BDR, and the minimum values $MIN_R$, $MIN_G$, $MIN_B$ from the decoded data. The quantized data $Q_R$, $Q_G$, $Q_B$ are supplied together with the block dynamic range BDR to converters 32R, 32G, 32B, respectively. The minimum values $MIN_R$, $MIN_G$, $MIN_B$ are supplied to calculators 32R, 32G, 32B, respectively.

The converter 32R converts the quantized data $Q_R$ derived from the demultiplexer 31 into a preselected level based on the block dynamic range BDR also derived from the multiplexer 31. In other words, as described in FIG. 1, the converter 32R converts the quantized data $Q_R$ into the corresponding level. Then this level is outputted to the calculator 32R.

Similar to the converter 32R, the converter 32G or 32B converts the quantized data $Q_G$ or $Q_B$ into a corresponding level, and then supplies the corresponding level to the calculator 33G or 33B.

The calculators 33R, 33G, 33B add the respective outputs from the converters 32R, 32G, 32B to the respective minimum values $MIN_R$, $MIN_G$, $MIN_B$ supplied from the demultiplexer 31, so that the R, G, B components are decoded, and the decoded R, G, B components are supplied to a synthesizing unit 34. The synthesizing unit 34 reconstructs 1-frame image after the R, G, B components of 1 frame have been supplied thereto, and then outputs the reconstructed 1-frame image as the decoded image.

Referring now to a flow chart shown in FIG. 8, operations of the image decoding apparatus will be described.

First, in the receiver/reproducing apparatus 30, the coded data recorded on the recording medium 2 is reproduced, or the coded data transmitted via the transmission path 3 is received, and then the decoded data is supplied to the demultiplexing unit (DMUX) 31. At a step S11, the demultiplexing unit 31 demultiplexes the quantized data $Q_R$, $Q_G$, $Q_B$, the block dynamic range BDR, and the minimum values $MIN_R$, $MIN_G$, $MIN_B$ from the decoded data. The quantized data $Q_R$, $Q_G$, $Q_B$ are supplied together with the block dynamic range BDR to converters 32R, 32G, 32B, respectively. The minimum values $MIN_R$, $MIN_G$, $MIN_B$ are supplied to calculators 33R, 33G, 33B, respectively.

Then, at a step S12, the converters 32R, 32G, 32B convert the quantized data $Q_R$, $Q_G$, $Q_B$ derived from the demultiplexer 31 based on the block dynamic range BDR also derived from the demultiplexer 31, and then supply the converted levels to the calculators 33R, 33G, 33B, respectively. Furthermore, at the step S12, the calculators 33R, 33G, 33B add the respective outputs from the converters 32R, 32G, 32B to the respective minimum values $MIN_R$, $MIN_G$, $MIN_B$ supplied from the demultiplexer 31, so that the R, G, B components are decoded, and the decoded R, G, B components are supplied to a synthesizing unit 34. At a further step S13, the synthesizing unit 34 temporarily stores the R, G, B components supplied from the respective calculators 33R, 33G, 33B, and then reconstructs the image when the R, G, B components of 1 frame are stored. This reconstructed image is outputted as the decoded image.

Thereafter, the process operation is returned to the step S12, the process operation is repeatedly performed with respect to the coded data for the next frame.

While the image processing apparatus to which the present invention has been applied has been described, such an image processing apparatus is very useful for an apparatus capable of coding/decoding, e.g., the standardized type TV signal such as the NTSC TV system, and the PAL TV system, and further an apparatus capable of coding/decoding a so-called "high-definition" type TV signal containing a large amount of data.

Figure 1B:
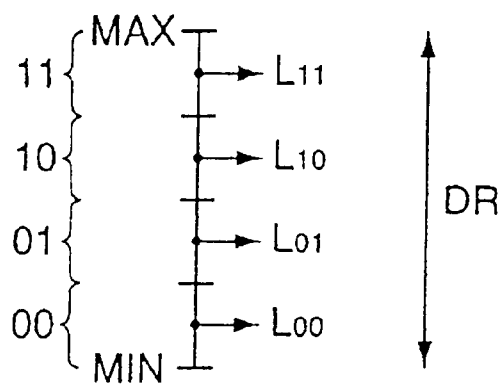
Figure 1C:
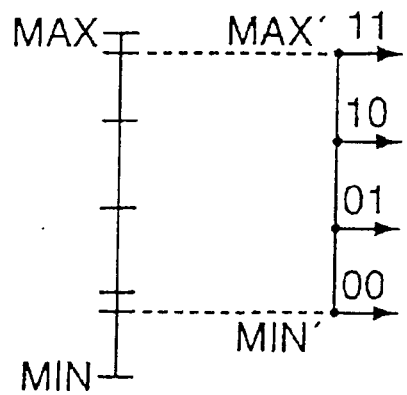

It should be noted that the present invention can be realized even when any of the ADRC processing operations of the edge matching process and the non-edge matching process, as previously explained in FIG. 1A to FIG. 1C. First, the non-edge matching process may be carried out as the pre-processing operation, and thereafter the multi-stage edge matching process such as the edge matching process may be performed.

Furthermore, according to this embodiment, the 1-frame image is subdivided into the image blocks so as to constitute the entire block. Alternatively, for, instance, pixels located at the same position in a plurality of time-sequentially continued frames may be collected to constitute the entire block.

Also, the R, G, B signals have been employed as the component signal in this embodiment. Alternatively, the present invention may be similarly applied to other component signals, e.g., YUV, YIQ, and further CMY (cyan, magenta, yellow), and also CMYK (cyan, magenta, yellow, black) as used in the printing field.

In accordance with the image coding apparatus as recited in the first aspect of the present invention and the image coding method as recited in the third aspect, the maximum value and the minimum value of each of the plural components for constituting the component signals in pixels within the blocks are detected, and then the dynamic range equal to the difference value between the maximum value and the minimum value of each of the plural components is calculated. Furthermore, the block dynamic range equal to the maximum value thereof from the dynamic range of each of the respective plural components is detected, and thereafter the quantizing step width used to quantize each of the plural components based on the block dynamic range are determined. Then, each of the plural components are quantized in accordance with the quantizing step width. As a result, the image signal constructed of the components can be compressed/coded in high efficiencies.

In accordance with the image decoding apparatus as recited in the fourth aspect of the present invention, in the case that the coded data is equal to such quantized data which is obtained by: detecting the maximum value and the minimum value of each of the plural components for constituting the component signals in pixels within the blocks; calculating the dynamic range equal to the difference value between the maximum value and the minimum value of each of the plural components; detecting the block dynamic range equal to the maximum value thereof from the dynamic range of each of the respective plural components; determining the quantizing step width used to quantize each of the plural components based on the block dynamic range; and quantizing each of the plural components in accordance with the quantizing step width; these quantized data corresponding to each of the plural components are converted into a predetermined level based on the block dynamic range. As a consequence, the component signals which have been compressed/coded in high efficiencies can be decoded.

In the recording medium as recited in the fifth aspect of the present invention, the below-mentioned quantized data are recorded as the coded data obtained by coding the image of the component signals constituted by a plurality of components. The quantized data are obtained by: detecting the maximum value and the minimum value of each of the plural components for constituting the component signals in pixels within the blocks; calculating the dynamic range equal to the difference value between the maximum value and the minimum value of each of the plural components; detecting the block dynamic range equal to the maximum value thereof from the dynamic range of each of the respective plural components; determining the quantizing step width used to quantize each of the plural components based on the block dynamic range; and quantizing each of the plural components in accordance with the quantizing step width. As a consequence, the image of the component signals can be recorded in high efficiencies.

What is claimed is:

1. An image coding apparatus for coding an image of a component signal constituted by a plurality of components, comprising:

block making means for subdividing said image to make a predetermined number of image blocks;

maximum/minimum value detecting means for detecting a maximum value and a minimum value of each of said plural components which constitute the component signals in pixels within said blocks;

dynamic range calculating means for calculating a dynamic range equal to a difference value between the maximum value and the minimum value of each of said plural components;

block dynamic range detecting means for detecting a block dynamic range equal to a maximum value thereof from said dynamic range of each of the respective plural components;

quantizing step width determining means for determining a quantizing step width used to quantize each of said plural components based upon said block dynamic range; and quantizing means for quantizing each of said plural components in accordance with said quantizing step width determined by said quantizing step width determining means.

2. An image coding apparatus as claimed in claim 1, further comprising:

difference calculating means for calculating a difference between each of said plural components and a minimum value thereof, wherein:

said quantizing means quantizes the difference between each of said plural components and the minimum value thereof.

3. An image coding method for coding an image of a component signal constituted by a plurality of components, comprising the steps of:

subdividing said image to make a predetermined number of image blocks;

detecting a maximum value and a minimum value of each of said plural components for constituting the component signals in pixels within said blocks;

calculating a dynamic range equal to a difference value between the maximum value and the minimum value of each of said plural components;

detecting a block dynamic range equal to a maximum value thereof from said dynamic range of each of the respective plural components;

determining a quantizing step width used to quantize each of said plural components based on said block dynamic range; and quantizing each of said plural components in accordance with said quantizing step width.

4. An image decoding apparatus for decoding coded data produced by coding an image of a component signal constituted by a plurality of components wherein:

in the case that said coded data is equal to such quantized data which is obtained by:

subdividing said image to make a predetermined number of image blocks;

detecting a maximum value and a minimum value of each of said plural components for constituting the component signals in pixels within said blocks;

calculating a dynamic range equal to a difference value between the maximum value and the minimum value of each of said plural components;

detecting a block dynamic range equal to a maximum value thereof from said dynamic range of each of the respective plural components;

determining a quantizing step width used to quantize each of said plural components based on said block dynamic range; and quantizing each of said plural components in accordance with said quantizing step width;

said image decoding apparatus is comprised of:

converting means for converting the quantized data corresponding to each of said plural components into a predetermined level based on said block dynamic range.

5. A recording medium on which decoded data produced by coding an image of a component signal constituted by a plurality of components has been recorded wherein:

said coded data is equal to such quantized data which is obtained by:

subdividing said image to make a predetermined number of image blocks;

detecting a maximum value and a minimum value of each of said plural components for constituting the component signals in pixels within said blocks;

calculating a dynamic range equal to a difference value between the maximum value and the minimum value of each of said plural components;

detecting a block dynamic range equal to a maximum value thereof from said dynamic range of each of the respective plural components;

determining a quantizing step width used to quantize each of said plural components based on said block dynamic range; and quantizing each of said plural components in accordance with said quantizing step width.

* * * * *